July 9, 1940.  C. O. COZZENS  2,206,880
OPHTHALMIC MOUNTING
Filed July 17, 1937
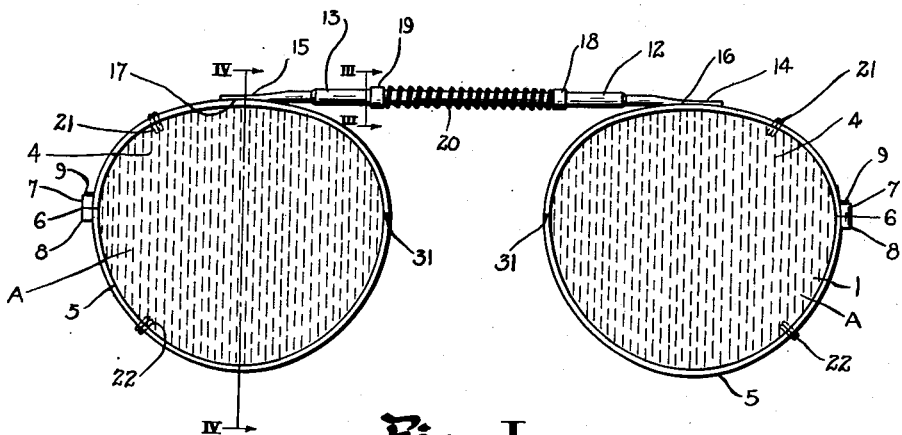
Fig. I
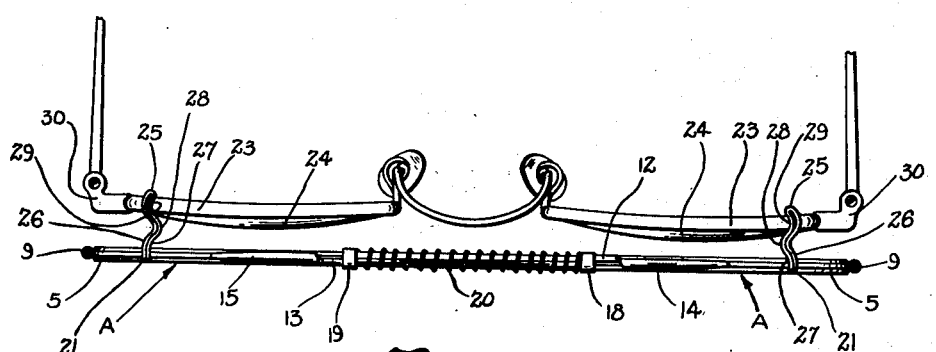
Fig. II
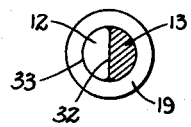
Fig. III
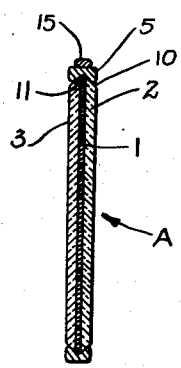
Fig. IV
INVENTOR
CHARLES O. COZZENS
BY
Harry H. Styll
ATTORNEY Patented July 9, 1940

2,206,880

UNITED STATES PATENT OFFICE 2,206,880

OPHTHALMIC MOUNTING

Charles O. Cozzens, Southbridge, Mass., assignor to American Optical Company, Southbridge, Mass., a voluntary association of Massachusetts Application July 17, 1937, Serial No. 154,276

2 Claims. (Cl. 88—41)

This invention relates to improvements in fit on eye protection devices and has particular reference to improved means and method of making the same.

One of the principal objects of the invention is to provide glare protection means of the type utilizing polarizing lenses which is adjustable so that it may be attached or fitted in place over the correction lenses of spectacles of varying sizes and be resiliently retained in position without changing the axis of polarization of the lenses.

Another object of the invention is to provide adjustable bridge means for supporting light polarizing lenses so that they may be moved to varying spaced relation with each other without altering the axis of polarization of said polarizing means.

Another object of the invention is to provide improved means and method of supporting polarizing lenses in attached relation with the correction lenses of a spectacle so that the said polarizing lenses will be retained in spaced relation with the correction lenses and will be resiliently held in their proper axis of polarization in superimposed relation with said correction lenses.

Another object is to provide a bridge for supporting polarizing lenses having superimposed portions which may be moved longitudinally relative to each other without changing the axis of the polarizing lenses, to move said polarizing lenses to varying spaced relations with each other, in combination with means for holding said superimposed portions in aligned relation with each other during said sliding movement and means for resiliently urging said longitudinally movable portions toward each other when extended and released.

Other objects and advantages of the invention will become apparent from the following description taken in connection with the accompanying drawing, and it will be apparent that many changes in the arrangement of parts, details of construction, and in the steps of the method may be made without departing from the spirit of the invention as expressed in the accompanying claims. I, therefore, do not wish to be limited to the exact details shown and described, as the preferred forms and methods only have been shown by way of illustration.

Referring to the drawing:

Fig. I is a front elevation of the device embodying the invention;

Fig. II is a plan view of the device shown in position on an ophthalmic mounting;

Fig. III is a sectional view taken on line III—III of Fig. I; and

Fig. IV is a sectional view taken on line IV—IV of Fig. I.

Sheet polarizing means may be produced consisting of a cellulosic film having a plurality of minute crystals having the property of polarizing light or polarizing periodides such as sulphate of quinidine, cinchonine and cinchonidine, oriented therein so as to polarize light intercepted by said film. In practice the film 1 is mounted between two glass plates 2 and 3, as illustrated in Figs. I and IV.

In Fig. I, the orientation of the minute crystals is illustrated by the dash lines 4.

The use of polarizing means before the eyes not only obviates annoying and offending reflected light, but renders objects visible which glaring caused by reflected light, will normally obscure or render practically invisible. Such polarizing means, under general conditions of glare, where the specular component forms a fair portion of the total amount of light such as exists during a major part of the daylight hours, are particularly useful when driving automobiles, as they not only eliminate the glare from the hood of the automobile and from the surface of the road, etc., but also render the warning signs more clear and distinct because of the removal of light which greys and obscures the surfaces of the road signs, etc.

Because of the fact, therefore, that the reflected light in most part, particularly specular light, vibrates in a direction parallel with the surface from which it is reflected and that it is this particular portion of the reflected light which it is desirous to obscure, the polarizing means before the eyes must be oriented in a direction normal to the direction of vibration of the reflected specular light or direction opposed to that of the direction of vibration of this portion of the reflected light.

The invention in this particular instance, therefore, resides primarily in the provision of means which will support the polarizing means or lenses in proper axial position before the eyes and yet permit adjustment of the lenses to varying spaced relations with each other so that they may be located and supported in proper position before the eyes.

This means, as shown in the drawing, comprises a pair of lens rims 5, divided as illustrated at 6 and provided with a pair of aligned lugs 7 and 8 adjacent said divided ends in which suitable connecting means 9, such as a screw, pin, etc., is placed to secure the lugs together and hold the divided ends of the rims against separation.

The polarizing means or lenses, which are designated as A in the drawing, are provided with a bevelled edge 10 adapted to fit within the inner bevelled surface 11 of the lens rims 5 and are formed to a contour shape which will fit said lens rims and permit the divided ends to be drawn together by the screws or like means 9 to secure the said lenses in said rims.

The lens rims are each provided with bar-like members 12 and 13, semi-circular in cross section, and adapted to fit adjacent each other, as shown in Fig. III. The ends 14 and 15 of each respective bar are enlarged and reduced and tapered outwardly to fit and blend with the lens rims. The under-surface 16 and 17 of each respective end is shaped to fit the adjacent contour of the lens rims 5 and is secured thereto throughout said fitted portion by welding or by solder or like means. The bar-like semicircular sectioned portions 12 and 13 fit in overlapped relation with each other and are held in said relation by suitable collars 18 and 19; the collar 18 is secured adjacent the end of the portion 13 and the collar 19 adjacent the end of the portion 12. The sections 12 and 13 are adapted to be slid longitudinally relative to each other with the collars 18 and 19 functioning as bearing means for holding them in alignment during said sliding movement. The flat faces of the semi-circular sections function to prevent twisting of the lenses A sidewise relative to each other during said sliding movement. Suitable resilient means 20 engaging the collars 18 and 19 adjacent its opposed ends provides means for resiliently urging the polarizing means or lenses A toward each other when the said means are moved outwardly against the compression action of the spring 20. This sliding adjustable function of the bridging means connecting the lenses A, permits the said lenses to be moved to varying spaced relation with each other without changing the axis of polarization of said lenses or polarizing means.

The lens rims 5 are each provided with a pair of spaced clips 21 and 22, which provide means by which the polarizing means may be clamped to the lens rims or lenses 23 of an ophthalmic mounting containing correction lenses 24. The clips 21 and 22 are preferably formed of wire stock bent at 25 to form two portions 26 and 27 lying in adjacent parallel relation with each other. The said portions 26 and 27 are secured adjacent their free ends to the lens rims 5 by solder or other suitable means. They are provided intermediate their ends with an inward bend 28 forming means cooperating with hook-like bends 29 for gripping the lens rims 23 and holding the lenses 24 in positive spaced relation with the polarizing means or lenses A, the inward bend 28 functioning as spacing means, and the hook-like portions 29 as gripping means. The tapered portions shown adjacent the bends 28 on the clips 21 and 22 direct the hook portions 29 into clamping engagement with the supports or lens rims 23 and hold the lenses 24 and lenses A in desired spaced relation with each other. The gripping action is a combined function of the resilient means 20, which constantly urges the lenses A toward each other in a sidewise direction, and the hook-like portions 29 which grip the lens rims 23 above and below the temple attachments 30, as shown in Figs. I and II. The lens rims 23 and 24 are those of the usual prior art type ophthalmic mounting. This mounting may be of the rimless type, in which instance the clips 21 and 22 will grip the peripheral edge of the lenses instead of the lens rims 23.

It is commonly known that ophthalmic mountings are made to different sizes in order to fit the requirements of different individuals. The present invention is particularly concerned in providing a mounting having polarization means or lenses A therein which is adjustable and which may be attached to ophthalmic mountings of different sizes, and which will have universal use and yet be so constructed as to maintain the axis of polarization of the polarizing means A in the desired meridian at all times.

The lens rims, as shown in Fig. I, are provided with suitable indication means 31 by which they may be aligned to insure that the polarizing crystals are in proper axial position during use. These indications also provide means for aiding in accurately positioning the lenses A in the lens rim when they are being secured in said lens rims. The dividing line 6 and indication means 31 are adapted to be maintained in alignment with each other during the use of the mounting so as to insure maximum of efficiency of the polarizing means A.

It will be particularly noted, as shown in Fig. I, that the width of the bars 12 and 13 is substantially twice the diameter of the adjacent integral end portions 14 and 15. This provides increased bearing surfaces 32 throughout the slide contact faces of the semi-circular bars and aids in holding the lenses A in a fixed plane during the sliding movement. The members 12 and 13 lie one behind the other when the mounting is viewed from the front and are prevented from twisting sidewise relative to each other by the relatively broad contiguous surfaces 32 which are held in sliding contact with each other by the sleeves 18 and 19. The sleeves 18 and 19 are secured throughout their engaging surfaces with the respective portions 12 and 13, as illustrated at 33, by solder or like means.

The surfaces 32 lie on a line intersecting the center of curvature of the sleeves 18 and 19, as illustrated in Fig. III, and each cross sectional shape of the portions 12 and 13 functions cooperatively to complete a circular section fitting within the bore of said sleeves and providing intimate sliding relation between the longitudinal portions.

From the foregoing description it will be seen that adjustable eye projection means having polarizing lenses have been provided whereby the lenses may be fitted to ophthalmic mountings of different sizes without changing the axes of polarization of said polarizing means.

Having described my invention I claim:

1. An eye protection device comprising a pair of lens holding members, means for adjustably connecting said lens holding members for movement in a relatively straight line to varying spaced relations with each other, each of said lens holding members having a polarizing member therein with its axis of polarization located in a predetermined meridian and each having means for clamping said device to a support, said means each comprising a part secured to its respective lens holding member for normally urging said lens holding members toward each other and means having a portion extending rearwardly and inwardly of the outer contour edge of the lens holding member and thence tapering outwardly and rearwardly to a hook shaped end.

2. An eye protection device comprising a pair of lens holding members, means having a resilient action for adjustably connecting said lens holding members so that the said members are free to move toward and away from each other under said resilient action, each of said lens holding members having means for supporting a polarizing member therein with its axis of polarization located in a predetermined meridian and each having gripping means cooperatively functioning with said means for adjustably connecting said lens holding members and with the resilient action of said means for clamping said device to a support, said gripping means each comprising a part rigidly related with the respective lens holding members and extending rearwardly and inwardly of the outer contour edges of the lens holding members and thence tapering outwardly and rearwardly to a hook shaped end which, when in clamping engagement with the support and polarizing members are in said lens holding members, is adapted to retain the axis of each polarizing member in a given meridian relative to said support with each outwardly tapering portion of the gripping means automatically functioning as cam means to space the lens holding member in given relation with the support to which the device is attached by the hook shaped ends of said gripping means.

CHARLES O. COZZENS.